(12) United States Patent
Köster

(10) Patent No.: US 12,371,111 B2
(45) Date of Patent: Jul. 29, 2025

(54) KINGPIN ARRANGEMENT

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 525 days.

(21) Appl. No.: 17/629,677

(22) PCT Filed: Jul. 28, 2020

(86) PCT No.: PCT/EP2020/071198
§ 371 (c)(1),
(2) Date: Jan. 24, 2022

(87) PCT Pub. No.: WO2021/018863
PCT Pub. Date: Feb. 4, 2021

(65) Prior Publication Data
US 2022/0242498 A1 Aug. 4, 2022

(30) Foreign Application Priority Data
Jul. 29, 2019 (DE) .................. 10 2019 120 437.2

(51) Int. Cl.
*B62D 53/08* (2006.01)
*B62D 53/12* (2006.01)

(52) U.S. Cl.
CPC ......... *B62D 53/0842* (2013.01); *B62D 53/12* (2013.01)

(58) Field of Classification Search
CPC .... B62D 53/08; B62D 53/12; B62D 53/0842; B62D 53/125; B62D 53/0878; B62D 53/0892
See application file for complete search history.

(56) References Cited

U.S. PATENT DOCUMENTS 1,931,752 A * 10/1933 Connors .............. B62D 53/125
200/16 R
3,181,887 A * 5/1965 Boylan .................. B60D 1/015
280/421

(Continued)

FOREIGN PATENT DOCUMENTS

CN 103930340 A 7/2016
CN 206394793 U 8/2017

(Continued)

OTHER PUBLICATIONS

Glaesar, J., Fifth Wheel for a Tractor and a Trailer, Oct. 18, 2007, EPO, DE 20 200714589 U, Machine Translation (Year: 2007).*

(Continued)

*Primary Examiner* — Jason D Shanske
*Assistant Examiner* — Scott Lawrence Strickler
(74) *Attorney, Agent, or Firm* — Price Heneveld LLP

(57) ABSTRACT

A kingpin arrangement for arrangement a commercial vehicle trailer, includes a kingpin that extends in an extension direction, a stator rotationally fixed with respect to the kingpin and a rotor that includes (a plug connector adapted to be connectable or connected to a complementarily configured plug element of a towing vehicle, wherein the stator includes at least one connection that is connected to a distribution network of the trailer at least in an installed state, wherein the connection is connected to the energy connection in an electrically conductive manner via an energy transmission device, and wherein the rotor is freely rotatable relative to the stator about an axis of rotation.

17 Claims, 2 Drawing Sheets

(56) References Cited

U.S. PATENT DOCUMENTS

| | | | | |
|---|---|---|---|---|
| 3,719,372 A * | 3/1973 | Rawlings | ............. | B62D 53/125 |
| | | | | 280/421 |
| 3,797,862 A * | 3/1974 | Letterman | ............... | H01R 39/64 |
| | | | | 280/901 |
| 5,909,891 A * | 6/1999 | Swart | ..................... | H01R 39/64 |
| | | | | 280/422 |
| 9,085,208 B1 * | 7/2015 | Riibe | ..................... | B60D 1/015 |
| 2010/0059967 A1 * | 3/2010 | Alguera | ................. | B60D 1/363 |
| | | | | 280/420 |
| 2019/0367105 A1 * | 12/2019 | Grossman | ............... | G01S 17/88 |

FOREIGN PATENT DOCUMENTS

| | | | | | |
|---|---|---|---|---|---|
| CN | 108666839 A | * | 10/2018 | | |
| DE | 102004024333 B4 | | 12/2005 | | |
| DE | 202007014589 U1 | * | 4/2009 | ......... | B62D 53/0842 |
| DE | 102008014285 A1 | * | 9/2009 | ............... | B60D 1/64 |
| EP | 2112008 B9 | | 10/2009 | | |

OTHER PUBLICATIONS

Espace translation of DE 10 2008 014285 A1 (Year: 2009).*
European Patent Office; International Search Report; Oct. 19, 2020; entire document.

* cited by examiner

KINGPIN ARRANGEMENT

BACKGROUND OF THE INVENTION

The invention relates to a kingpin arrangement having an energy connection, in particular a plug element.

Kingpin arrangements are already known from the prior art. These are used to transmit a tractive force from a trailer to a fifth wheel plate. This fifth wheel plate is mounted on a vehicle towing the trailer. However, the problem with the systems known from the prior art is that—due to the rotational movement of the towing vehicle and the trailer relative to each other—it is difficult to transmit current or other energy from the towing vehicle to the trailer.

It is therefore an object of the invention to provide a kingpin arrangement which enables safe energy transmission.

SUMMARY OF THE INVENTION

The invention relates to a kingpin arrangement for arrangement on a trailer, in particular a commercial vehicle trailer, comprising a kingpin, a rotor and a stator, wherein the kingpin extends in an extension direction, wherein the stator is arranged in particular rotationally fixed with respect to the kingpin, wherein the rotor comprises a energy connection, in particular a plug connector, wherein the plug connector is advantageously adapted to be connectable or connected to a complementarily configured plug element of a towing vehicle, wherein the stator comprises at least one connection, wherein the connection is connected to a distribution network of the trailer at least in an installed state, wherein the connection is connected to the plug connector in an energy-conducting, in particular electrically conductive, manner via an energy transmission device, wherein the rotor is freely rotatable relative to the stator about an axis of rotation. The kingpin arrangement according to the invention is intended to be arranged on a trailer, in particular a commercial vehicle trailer. The kingpin arrangement according to the invention has a kingpin which is designed to be couplable or insertable into a fifth wheel arrangement of a towing vehicle, so that towing forces can be transmitted from the towing vehicle via the kingpin to the trailer or the commercial vehicle trailer. The kingpin extends in an extension direction and is preferably at least partially rotationally symmetrical about this extension direction. A commercial vehicle trailer in the sense of the invention is in particular a trailer which has a permissible total mass of at least 5.01 t, preferably of at least 7.51 t and more preferably of at least 15.01 t and especially strongly preferably of at least 30 t. The kingpin arrangement according to the invention has a rotor and a stator, the rotor preferably being mounted indirectly and/or directly on the stator in order to achieve a kingpin arrangement which is as compact as possible. The stator of the kingpin arrangement is preferably arranged in relation to the kingpin such that the stator cannot rotate relative to the kingpin. In other words, this may mean that the stator may at most be translationally movably supported in relation to the kingpin. Advantageously, however, the stator is also supported in such a way that the stator cannot perform any translatory movement relative to the kingpin. The stator of the kingpin arrangement is connected in an energy-conducting manner, in particular in an electrically conductive manner, to an energy network, in particular a distribution network, of the trailer via at least one connection. In other words, this may mean that the connection of the stator serves to realize an energy flux from the stator into the trailer or into its distribution network. Preferably, the stator may be rotationally rigidly fixed to a trailer indirectly or directly. Alternatively preferably, however, the stator may be rotatably fixed to the trailer. For example, the connection may be formed by an electrical line extending from the stator and connected to the distribution network of a trailer. Alternatively or additionally preferably, the connection may be formed by a pneumatic connection. The stator may have not only one connection, but a plurality of connections. The rotor of the kingpin arrangement, on the other hand, is mounted rotationally with respect to the stator, in particular indirectly and/or directly rotationally on the stator. In particular, however, the rotor and the stator are mounted relative to each other in such a way that they cannot perform any translatory movement relative to each other. Alternatively or additionally preferably, the stator and the rotor are mounted on the same vehicle, in particular the towing vehicle or the trailer. In other words, the stator and the rotor therefore dissipate their bearing forces in particular into the same vehicle. The rotor may be arranged rotationally rigid with respect to the kingpin or rotatably mounted, in particular about the extension direction of the kingpin, in relation to the kingpin. This can provide a particularly mechanically loadable mounting of the rotor. Crucially, the rotor is rotatably mounted relative to the stator and the stator is fundamentally configured to make the energy connection to the network of the trailer and the rotor is fundamentally configured to make the energy connection to the network of the towing vehicle. The rotor has an energy connection for this purpose. However, the rotor may have not only one energy connection, but advantageously a plurality of energy connections. This energy connection can, for example, be a cable which is guided into or onto the rotor. Particularly preferably, however, the energy connection is at least partially formed by a plug connector, which can be attached, for example, to a supporting arm of the rotor. In particular, the connector is adapted to be connectable or connected to a complementarily formed connector element of a towing vehicle. In other words, the connector is particularly adapted to be able to make or provide an energy-conducting connection with a towing vehicle. The complementarily formed plug element of the towing vehicle may be arranged stationarily on the towing vehicle and/or may be formed, for example, by a plug element at one end of a, for example, loose power and/or pneumatic line. Crucially, the energy connection, in particular the plug element, is intended to be or can be connected directly and/or indirectly to a distribution network of a towing vehicle, so that energy can flow or drain from the towing vehicle into the energy connection of the rotor. The energy connection, in particular the plug connector, of the rotor is connected to the connection of the stator in an energy-conducting manner, in particular at least in an electrically conductive manner, via an energy transmission device. Through this, a certain energy conduction can take place in a plugged-in state from the towing vehicle into the trailer and vice versa via the kingpin arrangement. The rotor of the kingpin arrangement is mounted such that it is freely rotatable relative to the stator about an axis of rotation. Freely rotatable means in particular that the rotor is rotatable relative to the stator by at least 180°, preferably at least 360° and particularly strongly preferred completely freely rotatable. By completely freely rotatable it is to be understood that theoretically the rotor is rotatable relative to the stator about the axis of rotation an infinite number of times. Due to the free rotatability of the rotor relative to the stator, the kingpin arrangement according to the invention enables safe energy transmission even during a rotational movement between the trailer and the towing vehicle, as may be the case, for example, when cornering or when coupling or uncoupling.

Preferably, the axis of rotation is coaxial with the extension direction of the kingpin. This achieves a particularly compact kingpin arrangement. Particularly preferably, the axis of rotation is not only coaxial, but also aligned with the extension direction of the kingpin, through which a particularly good rotational mobility can be achieved, because in particular when cornering, the trailer rotates in relation to the towing vehicle about the kingpin extension direction, so that no length compensation has to be made in order to have to carry out the energy-conducting transmission between towing vehicle and trailer. Therefore, this type of arrangement or design of the kingpin arrangement is not only compact but also particularly cost-effective.

Advantageously, the rotor is mounted, in particular in relation to the stator, non-displaceably in the direction of the axis of rotation and/or perpendicularly to the direction of the axis of rotation, in particular on the stator. This non-displaceability of the rotor results in a particularly simple and mechanically loadable bearing arrangement. Alternatively preferably, the rotor can also be mounted to be displaceable to a certain extent, in particular 3±cm, in the direction of the axis of rotation and/or perpendicular to the direction of the axis of rotation, in particular in relation to the stator. This can provide a certain degree of compensation. This is particularly advantageous when the plug element of the towing vehicle is fixedly mounted, and thus some compensating movement must be provided by the kingpin arrangement. For example, the rotor may be generally mounted on plain bearings. This results in a particularly space-saving arrangement. Alternatively, preferably, the rotor can also be mounted on anti-friction bearings, which in particular reduces the friction that occurs.

Expediently, the energy connection, in particular the plug connector, has a plurality of electrical contacts, wherein the connection comprises a plurality of electrical connectors, wherein one contact in each case is electrically conductively connected to an electrical connector. By this exact assignment of exactly one electrical contact of the energy connection, in particular of the plug connector, with an electrical connector of the connection, it can be achieved that in particular malfunctions and/or faults in the energy transmission device can be easily detected or determined. Furthermore, this type of arrangement can also ensure that in particular certain components cannot be damaged by the failure or damage of a part of the energy transmission device due to an excessive current flow.

Preferably, the rotor or the stator comprises at least one current collector, in particular a brush collector, wherein the stator or the rotor comprises at least one slip ring, wherein the current collector makes electrically conductive contact with the slip ring indirectly and/or directly, wherein the slip ring is freely rotatable relative to the current collector. In other words, this may mean that the rotor comprises a current collector which electrically conductively contacts a slip ring arranged in the stator indirectly and/or directly such that a conductive connection between the rotor and the stator is achieved via this sliding contact. Alternatively, however, the current collector may also be arranged in the stator and the slip ring may form part of the rotor. By means of the slip ring and by means of the current collector, a particularly high flexibility of the rotor in relation to the stator is achieved. In particular, this makes it possible for the stator to be completely freely rotatable about an axis of rotation relative to the rotor.

In a preferred embodiment, each slip ring makes electrically conductive indirect and/or direct contact with at least two current collectors, which are advantageously arranged diametrically opposite each other. By providing at least two current collectors, each of which makes indirect and/or direct electrical contact with a slip ring, it can be achieved that at least a certain redundancy of the system is introduced. Furthermore, this double contacting or the provision of at least two current collectors per slip ring also has the advantage that the total electrical resistance is reduced by the provision of two contacting current collectors. This has the direct consequence that higher current strengths can be safely transmitted. By arranging the current collectors diametrically opposite each other, it can be achieved that the total resulting force through the contacts cancels each other out or is at least reduced, so that no or only small forces need to be absorbed. Advantageously, the current collectors and/or the slip rings are each spring-mounted in order to be able to compensate for any imbalance of the slip rings that may arise during operation.

Advantageously, the current collector(s) makes contact with the slip ring radially outwardly indirectly and/or directly in an electrically conductive manner. By this arrangement of the current collectors on a radially outwardly facing surface of the slip ring, a particularly simple arrangement can be made which is also particularly cost-effective. Furthermore, by this type of arrangement it can also be achieved that the slip ring can be kept particularly small. Alternatively preferably, the current collector or current collectors can also be arranged radially within the slip ring. This arrangement of the current collector within the slip ring results in an arrangement which is in particular more protected from external influences.

Expediently, the current collector(s) contacts the slip ring at a slip ring surface whose normal is parallel to the axis of rotation. In other words, this may mean that the slip ring surface lies in a plane whose normal is parallel to the axis of rotation. In this way, a particularly space-saving arrangement in the direction of the axis of rotation can be achieved.

Advantageously, the center of the slip ring, in particular of all slip rings, lies on the axis of rotation. By arranging the center of the slip ring on the axis of rotation, a particularly simple mounting of the entire rotor arrangement and/or stator arrangement can be effected. The center of the slip ring is in particular the center of gravity of the slip ring and/or that point around which the slip ring is rotationally symmetrically constructed.

Advantageously, the kingpin arrangement comprises a plurality of slip rings, the slip rings being coaxial with each other. By providing a plurality of slip rings, a plurality of different electrical currents and/or voltages can be transmitted between the stator and the rotor in an energy-conducting manner. By arranging these different slip rings coaxially with one another, it can be ensured or achieved that all of these slip rings are formed about the same axis, so that a particularly cost-effective and simple design of the rotor results.

In a preferred embodiment, the centers of the slip rings lie on the axis of rotation, and wherein the slip rings are arranged axially and/or radially to the axis of rotation. By arranging the centers of the slip rings on the axis of rotation, it can be ensured that no length offset compensating means need to be provided for contacting the current collectors with the respective slip ring, so that a particularly cost-effective kingpin arrangement results. By slip rings arranged axially to the axis of rotation it is to be understood that these are arranged one above the other in the direction of rotation.

In this way, for example, it can be achieved that all slip rings can have the same dimensioning, so that costs can be saved in the manufacture and maintenance or repair of the kingpin arrangement. If the slip rings are arranged in such a way that they are arranged radially with respect to the axis of rotation, a particularly space-saving kingpin arrangement can be achieved along the axis of rotation. This is particularly advantageous because only a small amount of installation space is available in the area of the kingpin on semitrailers.

Advantageously, the rotor comprises a surrounding housing, wherein, expediently, the stator also comprises a housing. By arranging a housing around the rotor or by providing a surrounding rotor housing, an engagement with the rotor can be prevented, so that the risk of injury is thereby reduced. It is particularly preferred if the stator also comprises a housing, in particular a multi-part housing. Advantageously, the rotor housing and the stator housing are positioned relative to one another in such a way that the gap lying between the housings permits free rotation, and in particular at the same time prevents engagement with the rotating or energy-conducting parts. This can be done, for example, by the gap between the rotor housing and the stator housing or between the housing parts having a maximum gap of 1 mm, preferably of 0.5 mm and particularly strongly preferably of 0.1 mm. Alternatively or additionally preferably, a seal may also be provided in this gap, for example to prevent the ingress of moisture and/or contamination. Such a seal may in particular be a shaft seal and/or an O-ring. Particularly preferably, however, the seal is a labyrinth seal, because this is particularly low-wear.

Expediently, the stator comprises at least one pneumatic line, wherein the freely extending end of the pneumatic line is arranged concentrically to the axis of rotation. By providing a pneumatic line in the stator, it can be achieved that in principle the kingpin arrangement is also able to be pneumatically connected to the system of the towing vehicle. By arranging the freely extending end of the pneumatic line concentrically and/or in alignment with the axis of rotation, it can be achieved that the tractor vehicle side pneumatic line and the stator side pneumatic line can rotate relative to each other and yet compressed air can be safely transmitted between these two lines. In order to prevent compressed air from escaping, the gap between such a pneumatic line on the stator side and a pneumatic line on the towing vehicle side must be kept as small as possible and/or requires the attachment of a sealing element.

In an advantageous embodiment, the stator comprises a plurality of pneumatic lines, wherein the freely extending ends of the pneumatic lines are concentric with each other, wherein the freely extending ends are arranged in particular concentrically to the axis of rotation. By providing a plurality of pneumatic lines, it is particularly possible to provide not only one compressed air flow between the towing vehicle and the trailer. This makes it possible, for example, to supply a compressed air braking system on the trailer by means of the compressed air system of the towing vehicle via the kingpin arrangement and/or to supply a plurality of consumers with compressed air.

Preferably, the plug connector has at least seven electrical contacts. By providing at least seven electrical contacts, a plurality and/or a complicated system such as in particular an ABS system can be supplied with power from the towing vehicle via the kingpin arrangement. Therefore, a particularly versatile kingpin arrangement results when at least seven electrical contacts are provided.

Advantageously, the plug connector comprises a guide pin. By providing a guide pin in the plug connector, the insertion of a plug element on the towing vehicle side can be facilitated, so that in particular the use of the kingpin arrangement can take place in an automatic coupling system.

Another aspect of the invention may relate to a commercial vehicle, in particular a commercial vehicle trailer, which has a kingpin arrangement according to the invention.

BRIEF DESCRIPTION OF THE DRAWINGS

Further advantages and features of the present invention will be apparent from the following description with reference to the figures. Therein, individual features of the embodiments shown may also be used in other embodiments, unless expressly excluded. It is shown in.

DETAILED DESCRIPTION OF THE PREFERRED EMBODIMENTS

Figure 1:
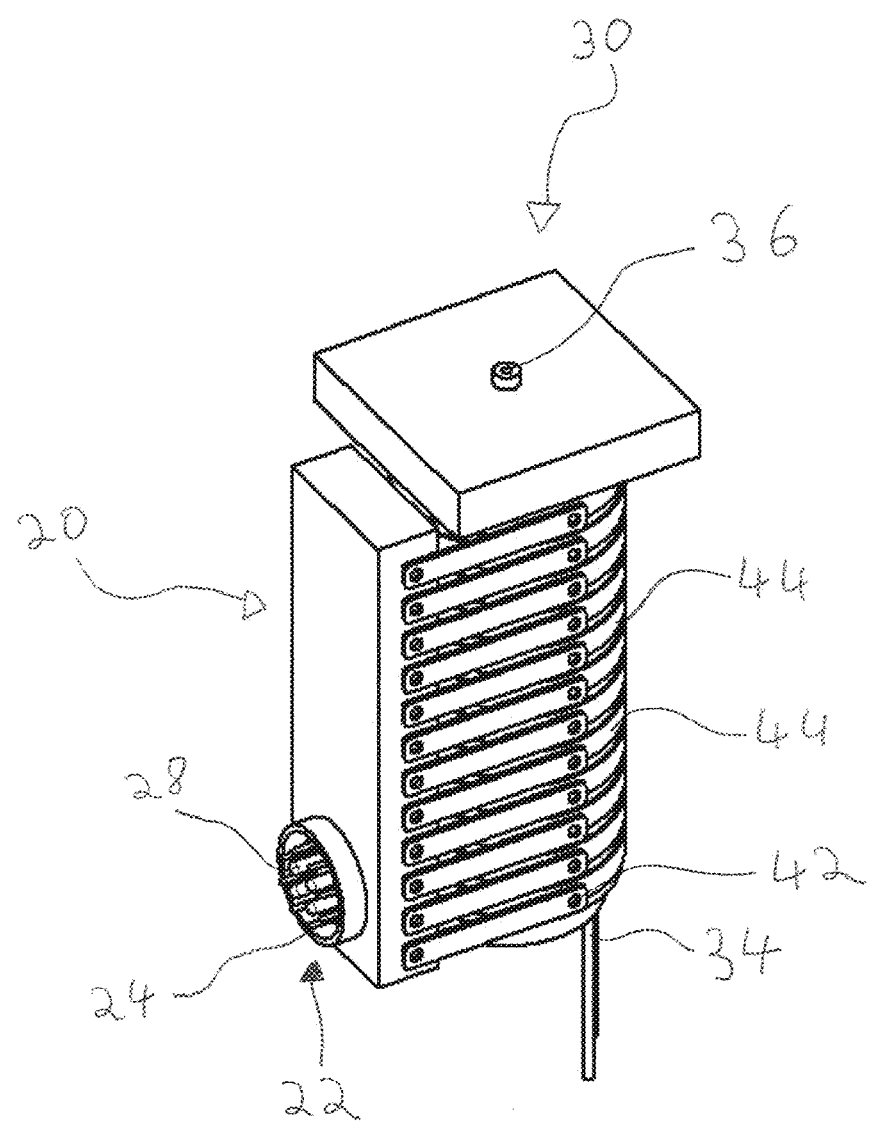
FIG. 1 is a perspective view of part of a kingpin arrangement.

FIG. 1 shows a kingpin arrangement 1 having a rotor 20 and a stator 30. The rotor 20 has a plug connector 22, which in turn has a plurality of guide pins 24 and a plurality of electrical contacts 28. Therein, in the embodiment shown, the rotor 20 is mounted so as to be completely free to rotate relative to the stator 30. The stator 30 has a connection 34 which, at least in an installed state, is connected in an energy-conducting manner to a distribution network of a trailer. In order to enable an energy conduction from this connection 34 to the electrical contacts 28 of the plug connector 22, the kingpin arrangement has an energy transmission device 26. Therein, this energy transmission device 26 has a plurality of slip rings 44 on the rotor side. In the embodiment shown in FIG. 1, the slip rings 44 each have a center which lies on the axis of rotation, and the slip rings 44 are also arranged axially with respect to the axis of rotation. In order to allow electrical energy to flow from these slip rings 44 to the electrical contacts 28 of the rotor 20, the rotor 20 has current collectors 42 which are resiliently mounted within the rotor 20. Therein, the current collectors 42 make electrically conductive indirect and/or direct contact with a respective slip ring 44 in order to achieve an energy conduction from the plug connector 22, in particular its electrical contacts 28, to the connection 34.

Figure 2:
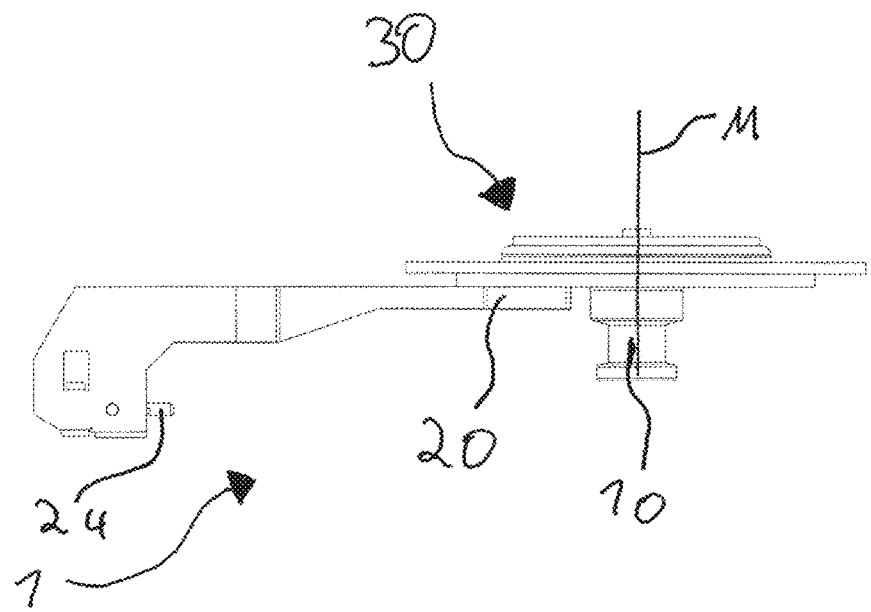
FIG. 2 is a side elevation view of the kingpin arrangement.
Figure 3:
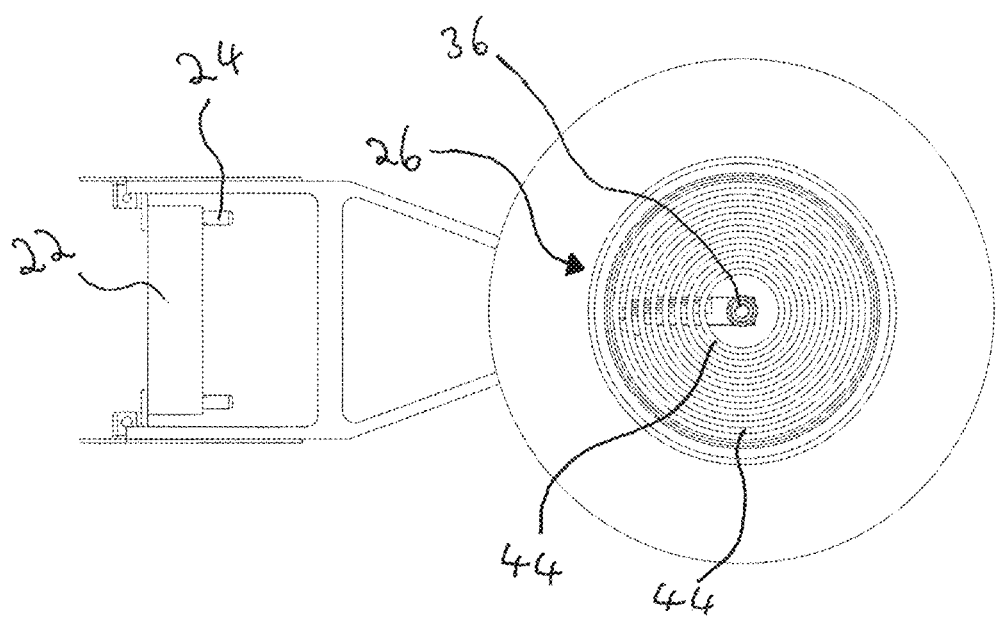
FIG. 3 is a top plan view of the kingpin arrangement.

FIGS. 2 and 3 show further embodiments of a kingpin arrangement 1. In FIG. 2, a side view of a kingpin arrangement 1 is shown and in FIG. 3 a top view is shown, wherein the embodiment shown in FIG. 2 can in principle match the embodiment shown in FIG. 3. The kingpin arrangement 1 has a kingpin 10, a stator 30 and a rotor 20. The rotor 20 has a power connection 22 in the form of a plug connector 22. The plug connector 22 has at least one guide pin 24. The connection 34, which is located on the stator 30, is connected to the energy connection 22 in an energy-conducting manner via an energy transmission device 26. The energy transmission device 26 has a plurality of slip rings 44, each of these slip rings 44 having a center M. The centers M of the slip rings 44 all lie on the axis M, as indicated in FIG. 2. A plurality of pneumatic lines 36 lie in the center of the slip rings 44, their freely extending ends being arranged concentrically to the axis of rotation.

LIST OF REFERENCE SIGNS

1—kingpin arrangement
10—kingpin

20—rotor
22—energy connection
24—guide pin
26—energy transmission device
28—electrical contact
30—stator
34—connection
36—pneumatic lines
42—current collector
44—slip ring
M—center

The invention claimed is:

1. A kingpin arrangement arranged on a commercial vehicle trailer, comprising:
 a kingpin that extends in an extension direction arranged on the commercial vehicle trailer;
 a stator arranged on a commercial vehicle trailer and rotationally fixed with respect to the kingpin; and
 a rotor arranged on the commercial vehicle trailer and that includes a plug connector;
 wherein the plug connector is configured to be connectable or connected to a plug element of a towing vehicle where the plug connector is complementarily configured to the plug element;
 wherein the stator includes at least one connection connected to a distribution network of the trailer at least in an installed state;
 wherein the at least on connection is connected to the plug connector in an electrically conductive manner via an energy transmission device; and
 wherein the rotor is freely rotatable relative to the stator about an axis of rotation.

2. The kingpin arrangement according to claim 1, wherein the axis of rotation is coaxial with the extension direction of the kingpin.

3. The kingpin arrangement according to claim 1, wherein the rotor is mounted non-displaceably in the direction of the axis of rotation and/or perpendicular to the direction of the axis of rotation relative to the stator.

4. The kingpin arrangement according to claim 3, wherein the rotor is mounted to the stator.

5. The kingpin arrangement according to claim 1, wherein the plug connector includes a plurality of electrical contacts, the connection includes a plurality of electrical connectors, and wherein one contact in each case of the plurality of contacts is electrically conductively connected to an electrical connector.

6. The kingpin arrangement according claim 1, wherein the rotor or the stator comprises at least one current collector, wherein the stator or the rotor comprises at least one slip ring, wherein the current collector makes electrically conductive connection with the slip ring indirectly and/or directly, and wherein the at least one slip ring is freely rotatable relative to the current collector.

7. The kingpin arrangement according to claim 6, wherein the at least one current collector includes a brush collector.

8. The kingpin assembly according to claim 6, wherein the at least one slip ring makes electrically conductive indirect and/or direct contact with at least two current collectors which are arranged diametrically opposite each other.

9. The kingpin arrangement according to claim 6, wherein the at least one current collector makes contact with the at least one slip ring radially outwardly indirectly and/or directly in an electrically conductive manner.

10. The kingpin arrangement according to claim 6, wherein the center of the at least one slip ring lies on the axis of rotation.

11. The kingpin arrangement according to claim 6, wherein the at least one slip ring includes a plurality of slip rings that are coaxial with one another.

12. The kingpin arrangement according to claim 11, wherein the center of each of the slip rings of the plurality of slip rings lie on the axis of rotation, and wherein the plurality of slip rings are arranged axially and/or radially to the axis of rotation.

13. The kingpin arrangement according to claim 1, wherein the rotor includes a surrounding housing, and/or wherein the stator includes a housing.

14. The kingpin arrangement according to claim 1, wherein the stator includes at least one pneumatic line, and wherein the freely extending end of the pneumatic line is arranged concentrically to the axis of rotation.

15. The kingpin arrangement according to claim 14, wherein the stator includes a plurality of pneumatic lines, and wherein freely extending ends of the pneumatic lines are concentric with each other and/or are arranged concentrically to the axis of rotation.

16. The kingpin arrangement according to claim 1, wherein the plug connector includes at least seven electrical contacts.

17. The kingpin arrangement according to claim 1, wherein the plug connector includes a guide pin.

* * * * *